United States Patent [19]
Rapp

[11] 3,785,833

[45] Jan. 15, 1974

[54] GLASSES OF THE $Na_2O$-$K_2O$-$Nb_2O_5$-$SiO_2$ SYSTEM AND GLASS CERAMICS MADE THEREFROM

[75] Inventor: James E. Rapp, Oregon, Ohio

[73] Assignee: Owens-Illinois, Inc., Toledo, Ohio

[22] Filed: Aug. 5, 1971

[21] Appl. No.: 169,513

[52] U.S. Cl.................... 106/39.6, 65/33, 106/52, 317/258, 350/176
[51] Int. Cl................................................ C03c 3/22
[58] Field of Search............. 106/52, 39 DV, 47 Q, 106/51, 39.6; 65/33

[56] References Cited
UNITED STATES PATENTS 3,113,877 12/1963 Janakirama-Rao................... 106/52
3,114,066 12/1963 Allen et al............................ 106/52

FOREIGN PATENTS OR APPLICATIONS 1,341,542 9/1963 France................................. 106/52

OTHER PUBLICATIONS

Berezhnoi, A.; Glass–Ceramics & Photo–Sitalls; New York, 1970, pp. 241–243. (TP86IB4)
Kingery, W. D.; Introduction to Ceramics; New York, 1967, pp. 576 & 662. TP807K5i)
Borelli et al.– Applied Physics Letters (1 Sept. 65) 7 pp. 117–118 "Electro–Optic Effect of Ferroelectric Microcrystals in a Glass Matrix".
Herczog– Glass Industry– Aug. 1967 pp. 445–500 "Ferroelectrics and Ferrites Crystallized From Glass".

*Primary Examiner*—Helen M. McCarthy
*Attorney*—E. J. Holler et al.

[57] ABSTRACT

Thermally crystallizable glasses of the $Na_2O$-$K_2O$-$Nb_2O_5$-$SiO_2$ system and glass-ceramics made therefrom which are highly transparent, have a high refractive index, high dielectric constant and low loss tangents. The glasses consist essentially of 23–38 mole percent $SiO_2$, 23–47 mole percent $Nb_2O_5$, 13–30 mole percent $Na_2O$ and 9–22 mole percent $K_2O$ wherein the $Na_2O$-to-$K_2O$ mole ratio is at least 0.7 and the ($Na_2O + K_2O$) to $Nb_2O_5$ mole ratio is from 0.8 to 1.8. By varying the heat treatment schedule for crystallization of the glass of the invention to a glass-ceramic, a specific high index of refraction and a specific dielectric constant within a prescribed range may be imparted to the finished transparent glass-ceramic. A glass-ceramic having two or more different indices of refraction and/or two or more dielectric constants may be produced.

13 Claims, No Drawings

GLASSES OF THE NA O-K O-NB O -SIO SYSTEM AND GLASS CERAMICS MADE THEREFROM

With the advent of acousto-optical devices, electro-optical devices and other devices utilizing transparent glasses and glass-ceramics, the need for glasses and glass-ceramics having a high index of refraction is becoming more acute. However, it is well known that the higher the index of refraction of the glass, the more difficult it is to obtain it in optical quality (freedom from bubbles, stones and cord). This is especially true when the index of refraction is about 1.7 or higher.

Acoustico-optical devices (sometimes called "elasto-optical" devices) are known in the art and reference is made to an article entitled "A Review of Acousto-Optical Deflection and Modulation Devices" by E.I. Gordon, which appeared in the proceedings of the I.E.E.E.[10]1391–1401(1966) and an article entitled "Dielectric Materials for Electro-Optic, Elasto-Optic and Ultrasonic Device Application" by E.G. Spencer et al, appearing in the proceedings of the I.E.E.E.,55[12]2074–2108 (1967).

Electro-optical devices are also well known and are described in U.S. Pat. No. 3,069,973 to I.Ames and in U.S. Pat. No. 3,467,463 to N.F. Borrelli et al.

While single crystal materials are of high quality and can be used in acousto-optical and electro-optical devices, they are relatively very expensive to obtain, especially in large sizes and, moreover, one is limited to the precise index of refraction inherent in any particular single crystal. The same is true with respect to the dielectric constant of single crystal material.

Transparent and opaque glass ceramics having high dielectric constants and low loss tangents or low dissipation factors are also useful in many electronic devices, including as supports for printed circuits, as capacitor dielectrics, and the like.

The present invention is directed to certain limited compositions having specific parameters coming within the broad definition of alkali metal oxide-$Nb_2O_5$-$SiO_2$ systems which can be readily formed into stable glasses and the glasses subsequently thermally in situ crystallized to form transparent glass ceramics having selected high indices of refraction or selected high dielectric constants with low loss tangents. Such glass ceramics can be formed from the crystallizable glasses even though the glasses do not have any of the customary nucleating agents, such as $TiO_2$, $ZrO_2$, $P_2O_5$, and the like. Glasses and glass ceramics of this invention are suitable for use in electro-optical devices, acousto-optical devices and the like. for example, as modulators, laser Q-switches and/or deflectors. Certain of such glasses and glass ceramics having high dielectric properties and very low dielectric losses are suitable for use in a variety of electrical devices, such as capacitors, electroluminescent cells, wave guides and the like. Dielectric constants of at least 100 (at room temperature and 0.1 MHz) and preferably of at least 200 and up to 500 or more with loss tangents or dissipation factors of less than 3 percent and preferably less than 1 percent obtained with glass ceramics of the present invention.

By the use of thermally crystallizable glasses of the present invention having a constant composition, each glass can, during an appropriate heat treatment process, be converted to a transparent, inorganic crystalline oxide ceramic material having any desired index of refraction or dielectric constant between a selected upper and a selected lower limit. Furthermore, a transparent ceramic material thus formed, also known as a glass-ceramic is non-porous and exhibits a relatively high optical index of refraction and contains a major portion of very tiny, fine grained, crystals of substantially uniform size embedded in a minor glassy matrix remaining as a result of the thermal crystallization.

Furthermore, the glass-ceramics of this invention can be prepared in the form of small chips, of a size of about ¼ inch and less, which are suitable for use as support carriers for printed micro-circuits for electronic components.

Within the broad spectrum of the alkali metal oxide-$Nb_2O_5$-$SiO_2$ systems, it has been found that a narrow range of compositions of the $Na_2O$-$K_2O$-$Nb_2O_5$-$SiO_2$ system have good glass-forming properties when the four sole essential ingredients are present in the composition within the following mole percent ranges:

$SiO_2$ — 23–38
$Nb_2O_5$ — 23–47
$Na_2O$ — 13–30
$K_2O$ — 9–22 wherein the $Na_2O/K_2O$ molar ratio is at least 0.7 and the $(Na_2O + K_2O)/Nb_2O_5$ molar ratio has a lower limit of 0.8 and has an upper limit ranging from 1 when the $Na_2O$ to $K_2O$ ratio is 0.7 to 1.8 when the $Na_2O$ to $K_2O$ is 3.3. Thus, higher ratios of such alkalis to $Nb_2O_5$ can be tolerated at higher $Na_2O$ to $K_2O$ ratios. The now preferred embodiments of the composition are those wherein the $Na_2O/K_2O$ molar ratio is about 1 to 2 and the $(Na_2O + K_2O)/Nb_2O_5$ molar ratio is about 1.

Glasses defined above have a high index of refraction, a moderate to high dielectric constant and can be thermally in situ crystallized to transparent glass ceramics having a still higher index of refraction or dielectric constant.

To illustrate the glasses and glass-ceramics of the invention several compositions were prepared by melting together silica, $Nb_2O_5$, $Na_2O$ and $K_2O$ in the mole percents set forth in the following table:

TABLE I

| Composition No. | 1 | 2 | 3 | 4 | 5 | 6 | 7 | 8 |
|---|---|---|---|---|---|---|---|---|
| $SiO_2$ | 35 | 35 | 30 | 30 | 35 | 30 | 30 | 25 |
| $Nb_2O_5$ | 25 | 32.5 | 27.5 | 35 | 32.5 | 35 | 37.5 | 37.5 |
| $Na_2O$ | 26.67 | 21.66 | 28.33 | 23.33 | 16.25 | 17.5 | 16.25 | 18.75 |
| $K_2O$ | 13.33 | 10.84 | 14.17 | 11.67 | 16.25 | 17.5 | 16.25 | 18.75 |
| Composition No. | 9 | 10 | 11 | 12 | 13 | 14 | 15 | 16 |
| $SiO_2$ | 30 | 20 | 10 | 30 | 30 | 20 | 20 | 40 |
| $Nb_2O_5$ | 35 | 30 | 45 | 45 | 35 | 50 | 40 | 22.5 |
| $Na_2O$ | 14.6 | 25 | 22.5 | 12.5 | 11.67 | 15 | 20 | 18.75 |
| $K_2O$ | 20.4 | 25 | 22.5 | 12.5 | 23.33 | 15 | 20 | 18.75 |

TABLE IA

|  | $SiO_2$ | $Nb_2O_5$ | $Na_2O$ | $K_2O$ |
|---|---|---|---|---|
| Example 1 | 18.0 | 57.03 | 14.19 | 10.75 |
| Example 2 | 16.03 | 65.94 | 10.25 | 7.78 |
| Example 3 | 14.76 | 59.93 | 14.40 | 10.92 |
| Example 4 | 13.19 | 68.17 | 10.60 | 8.04 |
| Example 5 | 15.82 | 65.02 | 7.58 | 11.51 |
| Example 6 | 13.01 | 67.25 | 7.84 | 11.89 |
| Example 7 | 12.58 | 69.69 | 7.04 | 10.68 |
| Example 8 | 10.42 | 69.26 | 8.08 | 12.25 |
| Example 9 | 12.92 | 66.81 | 6.50 | 13.77 |
| Example 10 | 9.18 | 60.99 | 11.86 | 17.97 |
| Example 11 | 3.73 | 74.43 | 8.68 | 13.16 |
| Example 12 | 11.46 | 76.13 | 4.93 | 7.48 |
| Example 13 | 12.84 | 66.36 | 5.16 | 15.64 |
| Example 14 | 7.13 | 78.97 | 5.53 | 8.38 |
| Example 15 | 8.03 | 71.11 | 8.29 | 12.57 |
| Example 16 | 21.22 | 52.90 | 10.28 | 15.59 |

Each of the compositions was heated to a temperature sufficient to melt the ingredients and then held at that temperature for about 1-24 hours, the time being dependent on the specific composition and how long it took for the melting to be completed and a homogeneous melt to be formed. The melt was periodically stirred during this time. Each molten composition was then poured onto a metal plate and another metal plate immediately placed over it to quench the composition. The glass-forming tendencies of each were then judged on the ability of the melt to be quenched into glass chips between the metal plates.

Glasses were formed from compositions 1 through 9, inclusive, all of which come within the scope of the present invention. Compositions 10-16 are outside the scope of the invention. Hardly any glass was formed from composition 10 which is outside the scope of the invention because of the high $(Na_2O + K_2O)/Nb_2O_5$ molar ratio and the low $SiO_2$ content. Composition 16, which has about the same molar ratios as composition 10 but a higher $SiO_2$ content did not form the desirable transparent glass-ceramic during further heat treatment. Composition 11 (low in $SiO_2$) formed no glass whatsoever. When each of the compositions 1-9 were subjected to temperatures sufficient to first nucleate and then crystallize the glass, very good transparent glass-ceramics were obtained in each instance. Compositions 12 and 14 formed glass-ceramics of very poor quality, while composition 13 could not be converted to the desirable transparent glass-ceramics. In fact, the latter compositions crumbled when subjected to the crystallization heat treatment.

The following table sets forth the heat treatment schedules utilized in thermally in situ crystallizing the glasses of the invention to glass-ceramics, and also shows the indices of refraction and the dielectric constants of the glasses and glass-ceramics.

TABLE II

| Properties and Treatment | Compositions | | | | |
|---|---|---|---|---|---|
|  | 1 | 2 | 3 | 4 | 5 |
| Index of Refraction (Glass) | 1.764 | 1.854 | 1.779 | 1.849 | 1.844 |
| Heat Treatment Temp. °F (Time,hours) | 1075(2) 1125(¼) 1350(¼) | 1125(2) 1250(¼) 1700(¼) | 1000(2) 1150(¼) 1300(½) | 1150(2) 1200(¼) 1700(¼) | 1125(18) 1250(¼) 1700(1) |

The index of refraction in the above crystallizable glasses is quite high and it has been found that glasses of the invention can be prepared having indices of refraction within the range of about 1.760 to 1.950 and preferably within the range of about 1.80 to 1.950. When the glasses are subjected to the crystallization scedule, the resultant glass ceramics have a higher index of refraction and preferably within the range of about 1.90 to 2.07 and even higher.

The indices of refraction of the glasses and glass-ceramics of the present invention are much higher than comparable indices of refraction of $SiO_2$-$Na_2O$-$K_2O$ glasses containing another metal oxide such as CaO, PbO, BaO and the like, which are usually in the range of 1.4992-1.5528, 1.5180-1.6571 and 1.5058-1.5881, respectively. See The Properties of Glass by George W. Morey, Second Edition, 1954, published by Reinhold Publishing Corporation, New York, and particularly pages 381-382, thereof.

It is unexpected to find that thermally crystallizable glasses can be formed from the $Na_2O$-$K_2O$-$Nb_2O_5$-$SiO_2$ systems wherein each of the four sole essential ingredients comes within a critical range and furthermore that each of such glasses has an index of refraction which is relatively higher than one would expect.

Glass-ceramics of the invention coming within the $Na_2O$-$K_2O$-$Nb_2O_5$$SiO_2$ systems also have high dielectric constants of at least 100 and preferably from 200-500 and higher with loss tangents or dissipation factors of less than 3 percent and preferably less than 1 percent.

While each of the glasses and glass-ceramics of this system has a very high index of refraction and the glass ceramicss have a high dielectric constant, the index and the dielectric constant of each glass ceramic can be varied to a desired figure by varying the heat treatment schedule when thermally in situ crystallizing the glasses. The amount of increase in the index or the dielectric constant is dependent on the heat treatment. This can be seen from the following table wherein several glass compositions of the invention are given different heat treatments, producing different indices of refraction and dielectric constants in the resulting glass ceramics.

TABLE III

| Composition No. | Heat Treatment Temp. °F (time,hours) | Dielectric Constant (R.T., 0.1 MHz) | Dissipation Factor, % | Index of Refraction |
|---|---|---|---|---|
| 1 | glass | | | 1.764 |
|  | 1075(2) | | | |
|  | 1125(¼) | 42.5 | 0.3% | 1.853 |
|  | 1075(2) | 102 | 0.4% | 1.911 |
|  | 1125(¼) | | | |

TABLE III-Continued

| Composition No. | Heat Treatment Temp. °F (time,hours) | Dielectric Constant (R.T., 0.1 MHz) | Dissipation Factor, % | Index of Refraction |
|---|---|---|---|---|
| 2 | 1275(½) 1075(2) 1125(½) 1350(½) | 106 | 0.7% | 1.913 |
| | glass | | | 1.854 |
| | 1125(2) 1250(½) | 112 | 0.68% | 1.979 |
| | 1125(2) 1250(½) 1350(½) | 143 | 0.27% | 2.011 |
| | 1125(2) 1250(½) 1500(½) | 170 | 0.56% | 2.006 |
| | 1125(2) 1250(½) 1700(½) | 194 | 0.94% | 2.000 |
| 4 | glass | | | 1.849 |
| | 1150(2) 1200(½) | 76.8 | 0.63% | 1.954 |
| | 1150(2) 1200(½) 1350(½) | 138 | 0.56% | 2.004 |
| | 1150(2) 1200(½) 1500(½) | 191 | 0.52 | 2.014 |
| | 1150(2) 1200(½) 1650(½) | 216 | 0.64 | 2.016 |
| 5 | glass | | | 1.844 |
| | 1225(2) 1250(½) | | | 1.947 |
| | 1200(16) 1250(½) | | | 1.981 |
| | 1400(1) 1200(16) 1250(½) | | | 1.991 |
| | 1600(1) 1125(16) 1250(½) | 118.2 | 0.18% | |
| | 1400(1) 1125(18) 1250(½) | 132.3 | 0.26% | |
| | 1500(1) 1125(18) 1250(½) | 127.4 | 0.31% | |
| | 1550(1) 1125(18) 1250(½) | 143.5 | 0.67% | |
| | 1600(1) 1125(18) 1250(½) | 188 | 0.27 | |
| | 1700(1) | | | |
| 8 | Glass | | | 1.862 |
| | 1075(2) 1200(½) | 209 | 0.38% | 2.022 |
| | 1075(2) 1200(½) 1350(½) | 212.4 | 0.57% | 2.047 |
| | 1075(2) 1200(½) 1400(½) | 223.5 | 0.41% | 2.053 |
| | 1075(2) 1200(½) 1500(½) | 361 | 0.65% | 2.067 |
| | 1075(2) 1200(½) 1700(½) | 438 | 0.30% | 2.067 |
| 9 | Glass | | | 1.841 |
| | 1175(2) 1200(½) | 117.4 | 0.23% | 2.006 |
| | 1175(2) 1200(½) 1350(½) | | | |
| | 1175(2) 1200(½) 1500(½) | 149.2 | 0.52% | 2.021 |

All of the glass-ceramics in Table III were transparent.

While the glasses and glass-ceramics of the invention have been discussed in terms of the sole essential ingredients, it will be evident to those skilled in the art that minor amounts preferably not more than 10 percent and most preferably no more than 5 percent by weight of other metal oxides which are compatible with the glass and glass-ceramic compositions can be used. Care should be taken, however, to insure that such other metal oxides do not materially affect the basic characteristics of the glasses and glass-ceramics of the present invention, including high indices of refraction, high dielectric constants and low dissipation factors.

Furthermore, while the glass-ceramics of the invention have been disclosed as being transparent, so that they can be used in many devices where transparency is important, it will be appreciated that if only the high dielectric constant of the glass-ceramic is required, the glass-ceramic can be further heat-treated to form an opaque glass-ceramic. The better opaque ceramics are obtained when both the $K_2O/Na_2O$ molar ratios and the $(Na_2O + K_2O)/(Nb_2O_5)$ molar ratios are $\geq 1$. Usually when the molar ratio is outside this range, the opaque ceramics are weak and crumble easily.

Transparent glass-ceramic articles or bodies having two or more indices of refraction can be prepared by subjecting different portions of the thermally crystallizable glass to the particular different heating schedules which produce the desired refraction indices. Thus, a crystallizable glass article of composition 1 could have one portion subjected to the first heat schedule of Table III, and another portion subjected to the second or third heat schedule of the same Table. The resulting transparent glass-ceramic article would have an index of refraction of 1.853 along the first portion and an index of 1.911 or 1.913 along the second portion.

Lenses, including eyeglass lenses, which are normally convex at one surface, can be made from flat sheets of transparent glass-ceramic wherein the center of the sheet or lens has a certain index of refraction and a number of concentric areas around the center are given different indices of refraction by subjecting such areas to the requisite heat schedules so that the indices of refraction are in ascending or descending magnitudes from the center to the outer periphery of the lens. Thus, using composition 4 and the four heat treatments set forth in Table III, the center of the transparent glass-ceramic lens of this composition can have an index of refraction of 2.016 and the three concentric areas around the center can have indices of refraction 2.014, 2.004, and 1.954, respectively. By utilizing an appropriate temperature gradient from the center to the edge, a smooth and continuous variation of the index of refraction from the center to the edge can be achieved. Changing the temperature gradient will change the resulting index of refraction gradient. This is an advantage over the Fresnel type lens where discrete changes in the index are achieved by gluing together glasses having different indices. Means for applying the gradient temperature to the thermally crystallizable glass are known in the art. Such lenses can be made to produce the same refraction of light rays as presently obtained by grinding the surface of a piece of glass to shape a particular lens. By combining grinding and the index of refraction gradient, even greater refraction of light can be obtained than by utilizing either the grinding or the index gradient alone. The process of imparting concentric indices of refraction to a thermally crystallizable glass to form a glass-ceramic article can be applied to a number of such glass articles, including transparent telescope mirror blanks which are made of glass-ceramic.

Another important application of this embodiment of the invention is in optical circuitry. By heat-treating a glass block or article so as to form a path of any desired shape and configuration within said block, with the glass-ceramic defining such a path having a particular higher index of refraction than the surrounding material, light can be made to follow such a path and can be bent as it travels about such a path. Thus, optical printed circuits can be readily made.

For example, a laser beam can be used to heat treat a particular spot within a thermally crystallizable glass block or chip and cause that portion of the block to form a glass-ceramic having a particular index of refraction. As the laser beam moves along the block, a narrow path defined by a glass-ceramic having a particular index of refraction is formed, since the heat of the laser beam is localized. The index is higher than that of the surrounding glass and light moving along the path stays within the path.

While glasses of the present invention, namely those within the particular $Na_2O$ - $K_2O$ - $Nb_2O_5$ - $SiO_2$ system are suitable for purposes of forming transparent glass-ceramics having a plurality of indices of refraction, other thermally crystallizable glasses can be used including those within the $Na_2O$-$Ta_2O_5$-$SiO_2$ system, the $Na_2O$-$Li_2O$-$Ta_2O_5$-$SiO_2$ system, $K_2O$-$Nb_2O_5$-$SiO_2$ system ($Na_2O$, $Li_2O$, $K_2O$)-$Nb_2O_5$-$Ta_2O_5$-$GeO_2$ systems and $SiO_2$-$Al_2O_3$-$Li_2O$ systems. An example of a thermally crystalizable glass coming within the latter system is as follows, with amounts expressed in weight percent:

$SiO_2$ — 66.9
$Al_2O_3$ — 20.9
$Li_2O$ — 3.9
$TiO_2$ — 1.8
$ZrO_2$ — 2.0
$CaO$ — 3.5
$Na_2O$ — 0.7
$Sb_2O_3$ — 0.3

Many glasses coming within the latter system and forming transparent glass-ceramics are known in the prior art.

An example of the glasses coming within the $K_2O$-$Nb_2O_5$-$SiO_2$ system suitable for forming glass-ceramics having an index of refraction gradient is as follows:

| Ingredient | Mole Percent |
|---|---|
| $SiO_2$ | 55 |
| $Nb_2O_5$ | 22.5 |
| $K_2O$ | 22.5 |

The batch ingredients for a 5 kg melt were melted in a crucible at a temperature of 2,200°F for 24 hours, quenched in water and then remelted and quenched several times. The last remelt was held at the temperature of 2,200°F for five hours. The crucible containing the molten glass was then placed within insulated fire brick which had been previously cut to provide an opening at the bottom thereof to permit the underside of the crucible to extend therethrough. The fire brick and crucible were then placed on a one-inch thick steel plate which had been preheated to a temperature of 900°F with the fire brick being supported on ⅛ inch thick blocks and the undersurface of the crucible in contact with the steel plate. The top of the crucible was covered with quartz felt and the molten glass was permitted to cool to 1,200°F. The steel plate, fire brick and crucible were then placed in an annealing furnace having a temperature of 1,180°F for about a half hour, at the end of which time the furnace was turned off and the glass permitted to cool to ambient temperature at furnace rate.

The annular transparent glass ceramic which had formed had a radial index of refraction gradient. While the index of refraction was 1.767, it varied in a regular manner from the center to the edge with a difference in the index of —.002. Very good radial symmetry was observed with respect to the index of refraction gradient.

Examples of glasses coming within the $Na_2O$-$Ta_2O_5$-$SiO_2$ and the $Na_2O$-$Li_2O$-$Ta_2O_5$-$SiO_2$ systems are set forth in my copending U.S. application Ser. No. 169,217 filed concurrently herewith, and the subject matter of that application is fully incorporated herein by reference.

The combination of transparency, control of final properties and moderate to high dielectric constant which the glass-ceramics of the invention possess is desirable for certain product applications such as optical integrated circuits, acousto-optical modulators and electro-optical modulators. It is also advantageous to form high dielectric printed circuit boards from glass-ceramics of the invention. For example a glass-ceramic board of about 2.5 = 1.5 = 0.25 inches can be made whereby spaced annular portions through the board can be subjected to different heat treatment schedules so as to impart different dielectric constants to those areas. When the remainder of the board surface is silver coated, but not the annular portions on each face, a printed circuit board can be produced having a different capacitance throughout the length of the body. Furthermore, one is now able to produce a glass-ceramic body having a desired dielectric constant or constants.

What is claimed is:

1. A thermally crystallizable glass suitable for the preparation of a transparent glass-ceramic having an index of refraction of from 1.90 to 2.07 and a dielectric constant of from 100 to 500, with a dissipation factor (R.T., 0.1 $MH_2$) of no more than about 3 percent, containing as the sole essential constituents of the glass 23–28 mole percent $SiO_2$, 23–47 mole percent $Nb_2O_5$, 13–30 mole percent $Na_2O$ and 9–22 mole percent $K_2O$, wherein
  a. the molar ratio of $Na_2O/K_2O$ is at least 0.7, and
  b. the molar ratio of $(Na_2O + K_2O)/(Nb_2O_5)$ has a lower limit of 0.8 and has an upper limit ranging from 1 when the $Na_2O$ to $K_2O$ ratio is 0.7 to 1.8 when the $Na_2O$ to $K_2O$ is 3.3.

2. The thermally crystallized glass as defined in claim 1 wherein the molar ratio of $(Na_2O + K_2O)/(Nb_2O_5)$ is about 1.

3. The thermally crystallizable glass as defined in claim 1 wherein said glass has an index of refraction of at least 1.76.

4. The thermally crystallizable glass as defined in claim 3 wherein said glass has an index of refraction within the range of about 1.76 to 1.95.

5. A transparent glass-ceramic formed by in situ crystallization of a crystallizable base glass containing as the sole essential constituents of the glass 23–38 mole percent $SiO_2$, 23–47 mole percent $Nb_2O_5$, 13–30 mole percent $Na_2O$ and 9–22 mole percent $K_2O$, wherein
  a. the molar ratio of $Na_2O/K_2O$ is at least 0.7, and
  b. the molar ratio of $(Na_2O + K_2O)/(Nb_2O_5)$ has a lower limit of 0.8 and has an upper limit ranging from 1 when the $Na_2O$ to $K_2O$ ratio is 0.7 to 1.8 when the $Na_2O$ to $K_2O$ is 3.3.

6. The transparent glass-ceramic as defined in claim 5 wherein the molar ratio of $(Na_2O + K_2O)/(Nb_2O_5)$ is about 1.

7. The transparent glass-ceramic as defined in claim 5 wherein the glass-ceramic has an index of refraction of at least 1.90.

8. The transparent glass-ceramic as defined in claim 7 wherein the glass-ceramic has an index of refraction of from 1.90 to 2.07.

0. The transparent glass-ceramic as defined in claim 5 wherein said glass-ceramic has a dielectric constant of at least 100.

10. The transparent glass-ceramic as defined in claim 5 wherein said glass-ceramic has a dielectric constant of from at least 200 up to about 500.

11. The transparent glass-ceramic as defined in claim 10 wherein said glass-ceramic has a dissipation factor (room temperature, 0.1 MHz) of no more than about 3 percent.

12. The transparent glass-ceramic as defined in claim 10 wherein said glass-ceramic has a dissipation factor (room temperature, 0.1 MHz) of no more than about 1 percent.

13. A transparent glass-ceramic having an index of refraction of from 1.90 to 2.07 and a dielectric constant of from 100 to 500, with a dissipation factor (R.T.,0.1 MHz) of no more than about 3 percent, said glass-ceramic formed by in situ crystallization of a crystallizable base glass containing as the sole essential constituents of the glass 23–38 mole percent $SiO_2$, 23–47 mole percent $Nb_2O_5$, 13–30 mole percent $Na_2O$ and 9–22 mole percent $K_2O$, wherein
  a. the molar ratio of $Na_2O/K_2O$ is at least 0.7, and
  b. the molar ratio of $(Na_2O + K_2O)/(Nb_2O_5)$ has a lower limit of 0.8 and has an upper limit ranging from 1 when the $Na_2O$ to $K_2O$ ratio is 0.7 to 1.8 when the $Na_2O$ to $K_2O$ is 3.3.

* * * * *

UNITED STATES PATENT OFFICE
CERTIFICATE OF CORRECTION

Patent No. 3,785,833          Dated January 15, 1974

Inventor(s) James E. Rapp

It is certified that error appears in the above-identified patent and that said Letters Patent are hereby corrected as shown below:

The Title at the head of Column 1 should read

-- Glasses Of The $Na_2O-K_2O-Nb_2O_5-SiO_2$ System And Glass Ceramics Made Therefrom --.

Column 2, line 6, after "percent" second occurrence -- are -- should be inserted.

Column 8, line 31, "2.5 = 1.5= 0.25" should read -- 2.5 x 1.5 x 0.25 --.

In the heading of Table III, in Column 4 and Column 5, the word "Dielectric" should be just above the word "Constant".

Table II in column 3 should read as shown on the attached Sheet.

Signed and sealed this 27th day of May 1975.

(SEAL)
Attest:

RUTH C. MASON
Attesting Officer

C. MARSHALL DANN
Commissioner of Patents
and Trademarks

TABLE II

Compositions

| Properties and Treatment | 1 | 2 | 3 | 4 | 5 |
|---|---|---|---|---|---|
| Index of Refraction (Glass) | 1.764 | 1.854 | 1.779 | 1.849 | 1.844 |
| Heat Treatment Temp. °F (Time, hours) | 1075(2) 1125(1/4) 1350(1/4) | 1125(2) 1250(1/4) ~~1750(1/2)~~ 1700(1/2) | 1000(2) 1150(1/4) 1300(1/2) | 1150(2) 1200(1/4) 1700(1/4) | 1125(18) ~~1200(2)~~ 1250(1/4) ~~1500(1/4)~~ 1700(1) |
| Index of Refraction (Glass-ceramics) | 1.913 | ~~2.011~~ 2.000 | 1.970 | 2.016 | 1.991 |
| Dielectric Constant (Room temp. 0.1 MHz) | 106 | 194 | 206 | 216 | 188 |
| Dissipation Factor (Room temp. 0.1 MHz) | 0.7% | 0.9% | 7% | 0.6% | 2.7% |

| Properties and Treatment | 6 | 7 | 8 | 9 |
|---|---|---|---|---|
| Index of Refraction (Glass) | 1.855 | 1.888 | 1.862 | 1.841 |
| Heat Treatment Temp. °F (Time, hours) | 1150(2) 1200(1/4) ~~1800(1/4)~~ 1650(1/4) | 1200(2) 1300(1/2) ~~1700(1/2)~~ 1725(1/2) | 1075(2) 1200(1/4) 1700(1/2) | 1175(2) 1200(1/4) 1650(1/2) |
| Index of Refraction (Glass-Ceramics) | 2.035 | ~~2.053~~ 2.043 | 2.068 | 2.026 |
| Dielectric Constant (Room temp. 0.1 MHz) | 289.5 | 270.6 | 438 | 266 |
| Dissipation Factor (Room temp. 0.1 MHz) | 3% | 3% | 3% | 3% |

UNITED STATES PATENT OFFICE
CERTIFICATE OF CORRECTION

PATENT NO. : 3,785,833  
DATED : January 15, 1974  
INVENTOR(S) : James E. Rapp

Page 1 of 4

It is certified that error appears in the above-identified patent and that said Letters Patent are hereby corrected as shown below:

Table III, Column 4 and Column 5, should read as shown on the attached 3 sheets.

TABLE III

| Composition No. | Heat Treatment Temp. °F (time, hours) | Dielectric Constant (R.T., 0.1 MHz) | Dissipation Factor, % | Index of Refraction |
|---|---|---|---|---|
| 1 | glass | | | 1.764 |
| | 1075(2) 1125(1/4) | 42.5 | 0.3% | 1.853 |
| | 1075(2) 1125(1/4) 1275(1/2) | 102 | 0.4% | 1.911 |
| | 1075(2) 1125(1/4) 1350(1/2) | 106 | 0.7% | 1.913 |
| 2 | glass | | | 1.854 |
| | 1125(2) 1250(1/4) | 112 | 0.68% | 1.979 |
| | 1125(2) 1250(1/4) 1350(1/2) | 143 | 0.27% | 2.011 |
| | 1125(2) 1250(1/4) 1500(1/2) | 170 | 0.56% | 2.006 |
| | 1125(2) 1250(1/4) 1700(1/2) | 194 | 0.94% | 2.000 |
| 4 | glass | | | 1.849 |
| | 1150(2) 1200(1/4) | 76.8 | 0.63% | 1.954 |
| | 1150(2) 1200(1/4) 1350(1/2) | 138 | 0.56% | 2.004 |
| | 1150(2) 1200(1/4) 1500(1/2) | 191 | 0.52 | 2.014 |
| | 1150(2) 1200(1/4) 1650(1/2) | 216 | 0.64 | 2.016 |

TABLE III (Continued)

| Composition No. | Heat Treatment Temp. °F (time,hours) | Dielectric Constant (R.T., 0.1MHz) | Dissipation Factor, % | Index of Refraction |
|---|---|---|---|---|
| 5 | glass | | | 1.844 |
| | 1225(2)<br>1250(1/4) | | | 1.947 |
| | 1200(16)<br>1250(1/4)<br>1400(1) | | | 1.981 |
| | 1200(16)<br>1250(1/4)<br>1600(1) | | | 1.991 |
| | 1125(16)<br>1250(1/4)<br>1400(1) | 118.2 | 0.18% | |
| | 1125(18)<br>1250(1/4)<br>1500(1) | 132.3 | 0.26% | |
| | 1125(18)<br>1250(1/4)<br>1550(1) | 127.4 | 0.31% | |
| | 1125(18)<br>1250(1/4)<br>1600(1) | 143.5 | 0.67% | |
| | 1125(18)<br>1250(1/4)<br>1700(1) | 188 | 0.27 | |
| 8 | Glass | | | 1.862 |
| | 1075(2)<br>1200(1/4) | 209 | 0.38% | 2.022 |
| | 1075(2)<br>1200(1/4)<br>1350(1/2) | 212.4 | 0.57% | 2.047 |
| | 1075(2)<br>1200(1/4)<br>1400(1/2) | 223.5 | 0.41% | 2.053 |
| | 1075(2)<br>1200(1/4)<br>1500(1/2) | 361 | 0.65% | 2.067 |
| | 1075(2)<br>1200(1/4)<br>1700(1/2) | 438 | 0.30% | 2.067 |

TABLE III (Continued)

| Composition No. | Heat Treatment Temp. °F (time, hours) | Dielectric Constant (R.T., 0.1 MHz) | Dissipation Factor, % | Index of Refraction |
|---|---|---|---|---|
| 9 | Glass | | | 1.841 |
| | 1175(2)<br>1200(1/4)<br>1350(1/2) | 117.4 | 0.23% | 2.006 |
| | 1175(2)<br>1200(1/4)<br>1500(1/2) | 149.2 | 0.52% | 2.021 |

Signed and Sealed this eighth Day of June 1976

[SEAL]

Attest:

RUTH C. MASON
*Attesting Officer*

C. MARSHALL DANN
*Commissioner of Patents and Trademarks*